United States Patent
Shimizu et al.

(10) Patent No.: US 10,622,116 B2
(45) Date of Patent: Apr. 14, 2020

(54) CONDUCTIVE WIRE, SHIELDING BRAIDED MEMBER, AND WIRE HARNESS

(71) Applicants: AUTONETWORKS TECHNOLOGIES, LTD., Yokkaichi-shi, Mie (JP); SUMITOMO WIRING SYSTEMS, LIMITED, Yokkaichi-shi, Mie (JP); SUMITOMO ELECTRIC INDUSTRIES, LTD., Osaka-shi, Osaka (JP)

(72) Inventors: Takeshi Shimizu, Yokkaichi (JP); Hirotaka Baba, Yokkaichi (JP); Yuta Kitahara, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/492,006

(22) PCT Filed: Mar. 13, 2018

(86) PCT No.: PCT/JP2018/009666
§ 371 (c)(1),
(2) Date: Sep. 6, 2019

(87) PCT Pub. No.: WO2018/168830
PCT Pub. Date: Sep. 20, 2018

(65) Prior Publication Data
US 2020/0075195 A1    Mar. 5, 2020

(30) Foreign Application Priority Data

Mar. 15, 2017    (JP) .................. 2017-050384

(51) Int. Cl.
*H01B 7/20* (2006.01)
*H01B 7/00* (2006.01)
*B60R 16/02* (2006.01)

(52) U.S. Cl.
CPC ....... *H01B 7/0045* (2013.01); *B60R 16/0215* (2013.01); *H01B 7/0009* (2013.01); *H01B 7/20* (2013.01)

(58) Field of Classification Search
CPC ...... H01B 7/0045; H01B 7/0009; H01B 7/20; B60R 16/0215
(Continued)

(56) References Cited

U.S. PATENT DOCUMENTS 4,045,949 A * 9/1977 Paton ............... D01D 5/28
57/244
4,207,376 A * 6/1980 Nagayasu ........... D01D 5/34
264/172.12
(Continued)

FOREIGN PATENT DOCUMENTS

JP    2012-212657 A    11/2012
JP    2014-055388 A    3/2014
JP    2014-120326 A    6/2014

OTHER PUBLICATIONS

May 29, 2018 International Search Report issued in International Patent Application No. PCT/JP2018/009666.

*Primary Examiner* — Timothy J Thompson
*Assistant Examiner* — Michael F Mcallister
(74) *Attorney, Agent, or Firm* — Oliff PLC

(57) ABSTRACT

Conductive wires that constitute a shielding braided member each include a core wire that is made up of insulating reinforced fibers, and a sheath member that is made of a metal material that covers the outer circumferential surface of the core wire.

9 Claims, 2 Drawing Sheets

(58) Field of Classification Search
USPC .......................................................... 174/72 A
See application file for complete search history.

(56) References Cited

U.S. PATENT DOCUMENTS

| | | | | |
|---|---|---|---|---|
| 4,606,968 | A * | 8/1986 | Thornton | B01D 39/083 |
| | | | | 442/187 |
| 4,803,096 | A * | 2/1989 | Kuhn | D06M 11/28 |
| | | | | 252/500 |
| 5,102,727 | A * | 4/1992 | Pittman | D03D 15/00 |
| | | | | 428/408 |
| 6,354,444 | B1 * | 3/2002 | Mahendran | B01D 67/0011 |
| | | | | 210/490 |
| 6,720,539 | B2 * | 4/2004 | DeAngelis | D02G 3/441 |
| | | | | 219/545 |
| 9,974,170 | B1 * | 5/2018 | Sunshine | H05K 1/038 |
| 10,227,714 | B2 * | 3/2019 | Salitsky | D03D 15/0005 |
| 2004/0099427 | A1 | 5/2004 | Kihira | |
| 2005/0095935 | A1 * | 5/2005 | Levine | D01F 6/96 |
| | | | | 442/110 |
| 2013/0333914 | A1 | 12/2013 | Kumada et al. | |
| 2014/0284100 | A1 * | 9/2014 | Ichikawa | B60R 16/0215 |
| | | | | 174/70 R |
| 2015/0287497 | A1 * | 10/2015 | Shiga | B60R 16/0215 |
| | | | | 174/84 R |

* cited by examiner

CONDUCTIVE WIRE, SHIELDING BRAIDED MEMBER, AND WIRE HARNESS The present embodiments relate to a conductive wire for use in a wire harness in a vehicle.

BACKGROUND

A shielding braided member (for example, see for example JP 3909703B) is a conventional example of a member constituted by conductive wires in a wire harness in a vehicle. A braided member is constituted by conductive wires that have been braided into a tubular shape.

SUMMARY

The inventors of the disclosed embodiments examined how to improve the strength of conductive wires that constitute a shielding braided member, as well as conductive wires that are not used for a shielding braided member in a wire harness.

An object of the certain embodiments is to provide a conductive wire, a shielding braided member, and a wire harness that have excellent strength.

A conductive wire that solves the foregoing problems is a conductive wire for use in a wire harness in a vehicle, the conductive wire including: a core wire made up of an insulating reinforced fiber; and a sheath member (sheath) that is made of a metal material that covers an outer circumferential surface of the core wire.

According to this configuration, the conductive wire has the core wire that is made up of a reinforced fiber, and the core wire is arranged inside the sheath member that is made of a metal material, and therefore it is possible to improve the strength of the conductive wire.

In an aspect of the conductive wire, the reinforced fiber is an aramid fiber.

According to this configuration, the core wire is constituted by an aramid fiber, and therefore it is possible to mote favorably improve the strength of the conductive wire.

In an aspect of the conductive wire, the core wire has been inserted into a metal pipe that is the sheath member.

According to this configuration, the core wire, which is made up of a reinforced fiber, is inserted into the metal pipe. For this reason, compared with a configuration in which the sheath member is a coating that is formed by vapor deposition, sputter, plating, or the like, there is a reduced possibility of degradation in electrical conductivity caused by peeling or the like of the sheath member, thus making it possible to obtain a highly reliable conductive wire.

In an aspect of the conductive wire, the sheath member is a fixed layer that is fixed to the outer circumferential surface of the core wire.

According to this configuration, the sheath member is made up of a fixed layer that is formed on the outer circumferential surface of the core wire by vapor deposition, sputtering, plating, or the like, and therefore the metal sheath member that covers the core wire can be formed easily.

A shielding braided member that solves the foregoing problems is obtained by braiding the conductive wires of any of the above configurations into a tubular shape.

According to this configuration, it is possible to provide a shielding braided member that achieves effects similar to any of the effects described above.

A wire harness that solves the foregoing problems includes the conductive wires according to any of the above configurations or the shielding braided member according to the above configuration.

According to this configuration, it is possible to provide a wire harness that achieves effects similar to any of the effects described above.

According to aspects of disclosed embodiments, it is possible to improve the strength of a conductive wire, a shielding braided member, and a wire harness.

DRAWINGS

DESCRIPTION

Figure 1:
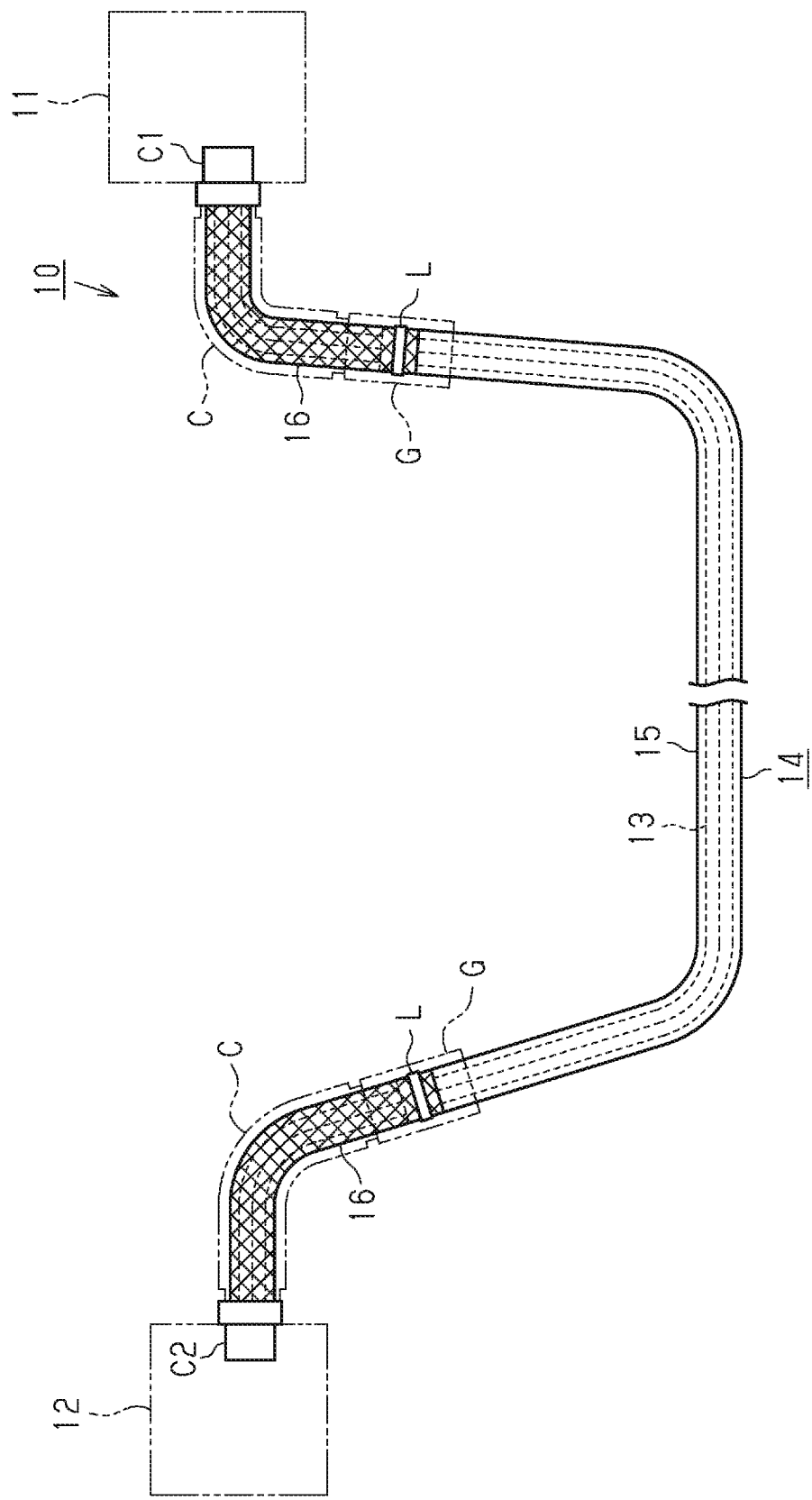
FIG. 1 is a schematic configuration diagram of a wire harness according to an embodiment.

The following describes an embodiment of a conductive wire, a shielding braided member (braided shield), and a wire harness. Note that for the sake of convenience in the description, portions of configurations are shown in an exaggerated or simplified manner in the drawings in some cases. The ratios of the dimensions of portions are also different from the actual ratios in some cases.

As shown in FIG. 1, a wire harness 10 of the present embodiment is routed in a vehicle such as a hybrid vehicle or an electric automobile so as to pass under the floor of the vehicle, for example, in order to connect a high-voltage battery 11 provided in a rear portion of the vehicle to an inverter 12 provided in a front portion of the vehicle, for example. The inverter 12 is connected to a wheel driving motor (not shown), which is a motive power source for vehicle traveling, generates alternating current power from direct current power received from the high-voltage battery 11, and supplies the alternating current power to the motor. The high-voltage battery 11 is a battery that is capable of supplying a voltage of several hundred volts.

The wire harness 10 includes an electrical wire bundle 13 that includes a high-voltage electrical wire, and an electromagnetic shield portion 14 that covers the outer circumferential surface of the electrical wire bundle 13. One end portion of the electrical wire bundle 13 is connected to the high-voltage battery 11 via a connector C1, and another end portion is connected to the inverter 12 via a connector C2.

The electromagnetic shield portion 14 includes a cylindrical shield pipe 15 and tubular braided members (braided shields) 16 that are respectively coupled to the two end portions of the shield pipe 15 by coupling members L. The electromagnetic shield portion 14 is overall shaped as an elongated tube. The intermediate portion of the electromagnetic shield portion 14 in the length direction is constituted by the shield pipe 15, and the sections that include the two lengthwise end portions, which are not included in the portion constituted by the shield pipe 15, are constituted by the braided members 16.

The shield pipe 15 is made of an aluminum-based metal material, for example. The shield pipe 15 is to be routed so as to pass under the floor of the vehicle, and is bent into a predetermined shape that corresponds to the configuration of the region under the floor. The shield pipe 15 shields all of the electrical wire bundles 13 that have been inserted therein, and protects the electrical wire bundles 13 from flying rocks and the like.

The braided members 16 are each a tubular member obtained by braiding a plurality of later-described conductive wires 21, and are flexible. The braided members 16 are coupled to respective end portions of the shield pipe 15 with use of the coupling members L, and the braided members 16 and the shield pipe 15 are thus in electrical conduction with each other. The braided members 16 also surround and shield the portions of all of the electrical wire bundles 13 that extend out from the end portions of the shield pipe 15. The end portions of the braided members 16 on the sides opposite to the shield pipe 15 are respectively connected to the connectors C1 and C2. Note that the braided members 16 are each surrounded by an external covering member C, which is a corrugated tube or the like. At each of the connection locations between the shield pipe 15 and the braided members 16, a rubber grommet G is attached so as to surround the connection location and prevent the intrusion of water.

Figure 2:
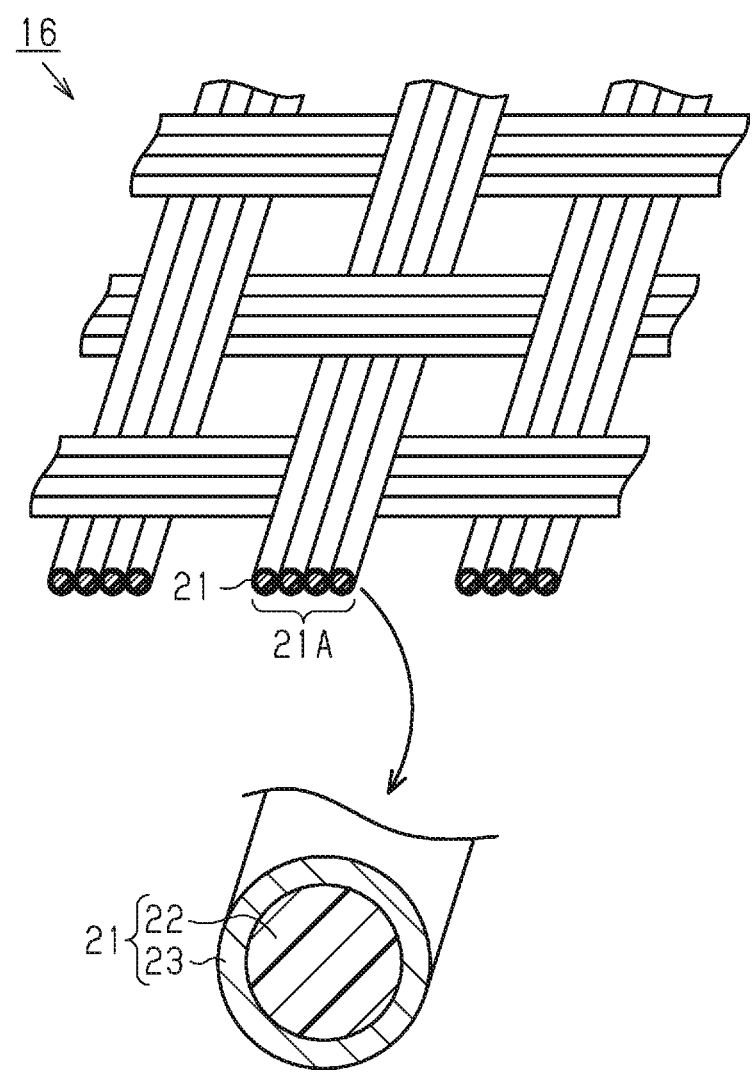
FIG. 2 is a schematic view of a braided member according to the embodiment.

As shown in FIG. 2, each braided member 16 is constituted by conductive wire bundles 21A that have been beaded into a lattice, and the conductive wire bundles 21A are each made up of a plurality of conductive wires 21. The conductive wires 21 that constitute the braided member 16 each include a core wire 22 that is made up of insulating reinforced fibers, and a sheath member (sheath) 23 that is made of a metal material that covers the outer circumferential surface of the core wire 22. Note that in the present embodiment, all of the strands that constitute the braided member 16 are the conductive wires 21.

The core wire 22 is a stranded wire (twisted wire) that is made up of a plurality of reinforced fibers that have an excellent insulating property and excellent shearing resistance. Examples of the reinforced fibers that constitute the core wire 22 include para-aramid fibers, polyarylate fibers, PBO (polyparaphenylene benzobisoxazole) fibers, PET (polyethylene terephthalate) fibers, ultra high molecular weight polyethylene fibers, PEI (polyetherimide) fibers, glass fibers, and ceramic fibers, and it is preferable that one or more of these is used in accordance with the properties that are required for the core wire 22. In the present embodiment, the core wire 22 is made up of one of the above types, namely para-aramid fibers.

The sheath member 23 is made up of a small-diameter cylindrical metal pipe that is made of copper or aluminum, and is configured to allow the core wire 22 to be inserted into the sheath member 23 (metal pipe). In other words, the sheath member 23 is not a coating that is formed by performing vapor deposition, sputtering, plating, or the like on the surface of the core wire 22, but rather is already shaped as a tube before the core wire 22 is arranged therein. Note that the inner circumferential surface of the sheath member 23 is in close contact with the core wire 22.

The following describes operations of the present embodiment.

The conductive wires 21 that constitute the braided members 16 each include the core wire 22, which has excellent impact resistance (particularly shearing resistance) and is obtained by braiding reinforced fibers that are para-aramid fibers or the like, and the conductive sheath member 23 inside which the core wire 22 is arranged. Accordingly, it is possible to suppress cases where the braided member 16 becomes damaged due to impact.

The following describes effects of the present embodiment.

(1) The conductive wires 21 that constitute the shielding braided member 16 each include the core wire 22 that is made up of insulating reinforced fibers, and the sheath member 23 that is made of a metal material that covers the outer circumferential surface of the core wire 22. For this reason, the electrical conductivity of the conductive wire 21 can be ensured using the sheath member 23, the strength of the conductive wire 21 can be improved using the core wire 22 that is made up of reinforced fibers.

(2) Aramid fibers are used as the reinforced fibers that constitute the core wire 22, thus making it possible to more favorably improve the strength of the conductive wire 21, which thus makes it possible to favorably improve the impact resistance of the braided member 16.

(3) The conductive wire 21 is obtained by inserting the core wire 22 into the sheath member 23 that is made up of a metal pipe. For this reason, compared with a configuration in which the sheath member that covers the core wire 22 is a coating that is formed by vapor deposition, sputter, plating, or the like, there is a reduced possibility of degradation in electrical conductivity caused by peeling or the like of the sheath member 23, thus making it possible to obtain a highly reliable conductive wire 21.

Note that changes such as the following may be made to the above embodiment.

Although all of the strands that constitute the braided member 16 are the conductive wires 21 in the above embodiment, the present invention is not limited to this, and the strands that constitute the braided member 16 may include simple metal wires, resin wires, or the like in addition to the conductive wires 21. In other words, some of the strands may be made of only metal or resin, instead of being the conductive wires 21.

Although the core wire 22 of the conductive wire 21 is a stranded wire (twisted wire) made up of a plurality of reinforced fibers in the above embodiment, the present invention is not limited to this, and the core wire 22 may be constituted by one reinforced fiber, a plurality of reinforced fibers that are not twisted together, or a bundle of stranded wires (twisted wires) that are made up of reinforced fibers.

Although the sheath member 23 is a metal pipe made of copper or aluminum in the above embodiment, the present invention is not limited to this, and the metal pipe may be made of a metal material other than copper or aluminum.

Although the conductive wire 21 is obtained by inserting the core wire 22 into the sheath member 23 that is made up of a metal pipe in the above embodiment, alternatively, the sheath member 23 may be, for example, a fixed layer that is fixed to the surface of the core wire 22 by vapor deposition, sputtering, plating, or the like. Also, a configuration is possible in which metal foil serving as the sheath member 23 is wound in a spiral manner around the core wire 22.

Instead of the shield pipe 15 in the above embodiment, it is possible to use a shield pipe that includes a pipe main body that is made of a non-metallic material (e.g., a resin material), and an electrically conductive shield layer that is laminated on or embedded in the pipe main body.

A configuration is possible in which the shield pipe 15 is omitted from the electromagnetic shield portion 14 of the above embodiment, and the portion that was covered by the shield pipe 15 is covered by the braided members 16.

Although the braided member 10 is for shielding in the above embodiment, the present invention is not limited to this, and the braided member 16 may be used as a conduction path (electrical wire).

The configuration of the electrical wires included in the electrical wire bundle 13 in the above embodiment may be changed as appropriate in accordance with the configuration of the vehicle. For example, the electrical wire bundle 13 may include a low-voltage electrical wire that is for connecting a low-voltage battery to various types of low-voltage devices (e.g., lamps and a car audio device). Also, the electrical wire bundle 13 may have a configuration not including the high-voltage electrical wire (e.g., may have a configuration including only the low-voltage electrical wire).

The positional relationship of the high-voltage battery 11 and the inverter 12 in the vehicle is not limited to the above embodiment, and may be changed as appropriate in accordance with the configuration of the vehicle. Also, although the high-voltage battery 11 is connected to the inverter 12 via the wire harness 10 in the above embodiment, the high-voltage battery 11 may be connected to a high-voltage device other than the inverter 12.

Although the present invention is applied to the wire harness 10 that connects the high-voltage battery 11 to the inverter 12 in the above embodiment, alternatively, the present invention may be applied to a wire harness that connects the inverter 12 to the wheel driving motor.

Although an example in which the conductive wire 21 is applied to the strands that constitute the shielding braided member 16 is described in the above embodiment, the present invention is not particularly limited to this, and the conductive wire 21 can be applied to a conductive wire other than the strands of a shielding braided member for use in a wire harness in a vehicle. For example, a conductive wire having a configuration similar to the conductive wire 21 of the above embodiment may be applied to a low-voltage electrical wire that is for transmitting a low-voltage (e.g., several mA) signal. Accordingly, it is possible to ensure the strength of the low-voltage electrical wire, and also achieve a reduction in size.

The above embodiment and variations may be combined as appropriate.

It will be apparent to those skilled in the art that the present invention may be embodied in other specific forms without departing from the technical concept of the invention. For example, the components described in the embodiment above (or one or more aspects thereof) may be partly omitted and/or combined. The scope of the present invention is to be defined with reference to the appended claims, along with the full range of equivalents to which the claims are entitled.

LIST OF REFERENCE NUMERALS

10 Wire harness
13 Electrical wire bundle
16 Braided member (shielding braided member/braided shield)
21 Conductive wire
22 Core wire
23 Sheath member (metal pipe)

The invention claimed is:

1. A conductive wire for use in a wire harness in a vehicle, the conductive wire comprising:
    a core wire made up of an insulating reinforced fiber; and
    a sheath member that is made of a metal material that covers an outer circumferential surface of the core wire,
    wherein the core wire has been inserted into a metal pipe that is the sheath.

2. The conductive wire according to claim 1, wherein the reinforced fiber is an aramid fiber.

3. The conductive wire according to claim 2, wherein the sheath is a fixed layer that is fixed to the outer circumferential surface of the core wire.

4. A shielding braided member comprising:
    a plurality of conductive wires braided into a tubular shape, wherein the conductive wires further comprise:
    a core wire made up of an insulating reinforced fiber; and
    a metal pipe that covers an outer circumferential surface of the core wire, the core wire being inserted into the metal pipe.

5. The shielding braided member according to claim 4, wherein the reinforced fiber is an aramid fiber.

6. The shielding braided member according to claim 5, wherein the metal pipe is a fixed layer that is fixed to the outer circumferential surface of the core wire.

7. A wire harness comprising:
    a shielding braided member comprising:
        a plurality of conductive wires braided into a tubular shape, wherein the conductive wires further comprise:
        a core wire made up of an insulating reinforced fiber; and
        a metal pipe that covers an outer circumferential surface of the core wire, the core wire being inserted into the metal pipe.

8. The wire harness according to claim 7, wherein the reinforced fiber is an aramid fiber.

9. The wire harness according to claim 8, wherein the metal pipe is a fixed layer that is fixed to the outer circumferential surface of the core wire.

* * * * *